United States Patent
Saito

(10) Patent No.: US 11,529,845 B2
(45) Date of Patent: Dec. 20, 2022

(54) AIR-CONDITIONING CONTROL SYSTEM, AIR-CONDITIONING MANAGEMENT SYSTEM, AND IN-VEHICLE AIR-CONDITIONING SYSTEM

(71) Applicant: TOYOTA JIDOSHA KABUSHIKI KAISHA, Toyota (JP)

(72) Inventor: Kan Saito, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 479 days.

(21) Appl. No.: 15/929,198

(22) Filed: Jan. 2, 2020

(65) Prior Publication Data
US 2020/0276880 A1 Sep. 3, 2020

(30) Foreign Application Priority Data
Mar. 1, 2019 (JP) .............................. JP2019-037904

(51) Int. Cl.
*B60H 1/00* (2006.01)
(52) U.S. Cl.
CPC ....... *B60H 1/00785* (2013.01); *B60H 1/0073* (2019.05); *B60H 1/00849* (2013.01)
(58) Field of Classification Search
CPC .............. B60H 1/0073; B60H 1/00849; B60H 1/00785
See application file for complete search history.

(56) References Cited

U.S. PATENT DOCUMENTS

| 5,546,754 A | 8/1996 | Terao et al. |
| 6,067,808 A | 5/2000 | Dage |
| 6,330,909 B1 | 12/2001 | Takahashi et al. |
| 10,576,806 B1 * | 3/2020 | Madireddi ......... B60H 1/00742 |
| 2003/0121988 A1 | 7/2003 | Rutyna et al. |

(Continued)

FOREIGN PATENT DOCUMENTS

| CN | 101815919 A * | 8/2010 | ........... F28D 1/0477 |
| DE | 699 35 833 T2 | 12/2007 | |

(Continued)

OTHER PUBLICATIONS

German Office Action dated Aug. 26, 2020 in Patent Application No. 10 2020 100 370.6 (with English translation), 13 pages.

(Continued)

*Primary Examiner* — Nelson J Nieves
(74) *Attorney, Agent, or Firm* — Oblon, McClelland, Maier & Neustadt, L.L.P.

(57) ABSTRACT

An air-conditioning control system includes: a weather acquisition unit configured to obtain weather information including a weather forecast; a prediction unit configured to predict, based on the weather information, an amount of change in a quantity of water droplets adhering to an evaporator of an air conditioner installed in a vehicle; and a switching control unit configured to control switching of an inside/outside air switching mechanism of the air conditioner based on the amount of change, the inside/outside air switching mechanism switching air delivered to an interior of the vehicle to one of inside air and outside air, the inside air being air in the interior of the vehicle, the outside air being air outside the vehicle.

11 Claims, 14 Drawing Sheets

(56) References Cited

U.S. PATENT DOCUMENTS

| | | | | |
|---|---|---|---|---|
| 2003/0230094 | A1* | 12/2003 | Takano | B60H 1/00785 62/80 |
| 2010/0031680 | A1* | 2/2010 | Eisenhour | B60H 1/3207 62/176.1 |
| 2012/0221198 | A1* | 8/2012 | Kohavi | B60H 1/00849 62/318 |
| 2014/0318159 | A1* | 10/2014 | Eisenhour | B60H 1/3211 62/89 |
| 2017/0368906 | A1* | 12/2017 | Inui | B60H 1/00771 |
| 2018/0009290 | A1* | 1/2018 | Inui | F25B 47/006 |
| 2018/0029442 | A1* | 2/2018 | Inui | G05D 23/1919 |
| 2018/0079281 | A1* | 3/2018 | Leone | F02M 25/028 |
| 2018/0259240 | A1 | 9/2018 | Onishi et al. | |
| 2019/0225189 | A1* | 7/2019 | Maeda | B60S 1/023 |
| 2019/0381865 | A1* | 12/2019 | Oshikiri | B60H 1/00785 |
| 2021/0316593 | A1* | 10/2021 | Ishizeki | B60H 1/00764 |

FOREIGN PATENT DOCUMENTS

| | | | | |
|---|---|---|---|---|
| DE | 102009029990 A1 * | 12/2010 | | B60H 1/005 |
| DE | 102014102078 A1 * | 8/2015 | | B60H 1/0073 |
| DE | 10 2015 007 063 B3 | 7/2016 | | |
| DE | 102019105194 A1 * | 9/2019 | | B01D 47/00 |
| JP | 07-156646 A | 6/1995 | | |
| JP | 2004182202 A * | 7/2004 | | |
| JP | 2015-89711 A | 3/2015 | | |
| JP | 2015-089710 A | 5/2015 | | |
| JP | 2016-159831 A | 9/2016 | | |
| JP | 2017-021420 A | 1/2017 | | |
| JP | 2017226397 A * | 12/2017 | | B60H 1/00735 |
| JP | 2018-149925 A | 9/2018 | | |
| JP | 2018-169313 A | 11/2018 | | |
| KR | 20080038907 A * | 5/2008 | | |
| KR | 20180070892 A * | 6/2018 | | |
| WO | WO-2015036833 A1 * | 3/2015 | | B60H 1/00764 |
| WO | WO-2016134082 A1 * | 8/2016 | | |
| WO | WO 2018/177001 A1 | 10/2018 | | |

OTHER PUBLICATIONS

Japanese Office Action dated May 31, 2022 in Japanese Patent Application No. 2019-037904 (with unedited computer generated English translation), 10 pages.

* cited by examiner

FIG. 7

| DETECTION DATE AND TIME | IGNITION SWITCH | POSITIONAL INFORMATION (LATITUDE, LONGITUDE) |
|---|---|---|
| 2019/8/5 08:00 | ON | N1, E1 |
| 2019/8/5 08:30 | OFF | N2, E2 |
| 2019/8/5 18:00 | ON | N2, E2 |
| 2019/8/5 18:30 | OFF | N1, E1 |
| 2019/8/6 08:00 | ON | N1, E1 |
| 2019/8/6 08:30 | OFF | N2, E2 |
| 2019/8/6 18:00 | ON | N2, E2 |
| 2019/8/6 18:30 | OFF | N1, E1 |
| 2019/8/7 08:00 | ON | N1, E1 |
| 2019/8/7 08:30 | OFF | N2, E2 |
| 2019/8/7 18:00 | ON | N2, E2 |
| 2019/8/7 18:30 | OFF | N1, E1 |

N1, E1: HOME
N2, E2: WORK SITE

FIG. 9

| IN-VEHICLE COMMUNICATION DEVICE ID:12345678 ||| |
|---|---|---|---|
| DETECTION DATE AND TIME | IGNITION SWITCH | POSITIONAL INFORMATION (LATITUDE, LONGITUDE) | |
| 2019/8/5 08:00 | ON | N1, E1 | FINISH PARKING OF VEHICLE (HOME) |
| 2019/8/5 08:30 | OFF | N2, E2 | PARKED (WORK SITE) |
| 2019/8/5 18:00 | ON | N2, E2 | |
| 2019/8/5 18:30 | OFF | N1, E1 | PARKED (HOME) |
| 2019/8/6 08:00 | ON | N1, E1 | |
| 2019/8/6 08:30 | OFF | N2, E2 | PARKED (WORK SITE) |
| 2019/8/6 18:00 | ON | N2, E2 | |
| 2019/8/6 18:30 | OFF | N1, E1 | PARKED (HOME) |
| 2019/8/7 08:00 | ON | N1, E1 | |
| 2019/8/7 08:30 | OFF | N2, E2 | PARKED (WORK SITE) |
| 2019/8/7 18:00 | ON | N2, E2 | |
| 2019/8/7 18:30 | OFF | N1, E1 | START PARKING OF VEHICLE (HOME) |

N1, E1: HOME
N2, E2: WORK SITE

FIG. 10

| DATE | 2019/8/7 | | 2019/8/8 | | |
|---|---|---|---|---|---|
| TIME | 18:00-21:00 | 21:00-00:00 | 00:00-03:00 | ... | 06:00-09:00 |
| TEMPER-ATURE | 25°C | 26°C | 26°C | ... | 27°C |
| HUMIDITY | 90% | 95% | 93% | ... | 96% |
| AMOUNT OF RAINFALL | 50 mm/h | 55 mm/h | 53 mm/h | ... | 56 mm/h |
| WIND | NORTH WIND 3 m/s | WEST WIND 6 m/s | SOUTH WIND 1 m/s | ... | WEST WIND 4 m/s |

FIG. 12

| 2019/8/7 18:00-21:00 | | -30°C | ... | -5°C | 0°C | 5°C | 10°C | ... | 25°C | 30°C |
|---|---|---|---|---|---|---|---|---|---|---|
| HUMIDITY | 0% | 0 | ... | -0.7 | -1.0 | -1.3 | -1.5 | ... | -4.5 | -5.0 |
| | 10% | 0 | ... | -0.6 | -0.8 | -1.0 | -1.1 | ... | -4.0 | -4.5 |
| | 20% | 0 | ... | -0.5 | -0.7 | -0.9 | -1.0 | ... | -3.8 | -4.2 |
| | ... | ... | ... | ... | ... | ... | ... | ... | ... | ... |
| | 90% | 0 | ... | +0.1 | +0.2 | +0.2 | +0.3 | ... | +0.9 | +0.9 |
| | 100% | 0 | ... | +0.2 | +0.3 | +0.3 | +0.4 | ... | +1.0 | +1.1 |

TEMPERATURE

AIR-CONDITIONING CONTROL SYSTEM, AIR-CONDITIONING MANAGEMENT SYSTEM, AND IN-VEHICLE AIR-CONDITIONING SYSTEM

CROSS-REFERENCE TO RELATED APPLICATION

This application is based upon and claims the benefit of priority of the prior Japanese Patent Application No. 2019-037904, filed on Mar. 1, 2019, the entire contents of which are incorporated herein by reference.

TECHNICAL FIELD

The present disclosure relates to an air-conditioning control system, an air-conditioning management system, and an in-vehicle air-conditioning system.

BACKGROUND

There has been known a technique that operates a blower for a certain period of time when it is detected that the vehicle is parked to quickly remove the condensed water adhering to an evaporator to prevent air containing unpleasant odor from being blown into the vehicle interior. There has been also known a technique that introduces outside air into the vehicle interior after the ignition switch of the vehicle is turned off to ventilate the vehicle interior while reducing the power consumption of the blower as disclosed in, for example, Japanese Patent Application Publication Nos. H7-156646 and 2016-159831.

However, the effect in removing the condensed water greatly varies depending on the conditions of the outside air introduced into the vehicle interior. For example, depending on the humidity of the outside air, the condensed water is not sufficiently removed from the evaporator, and the amount of adhesion condensed water may rather increase.

SUMMARY

It is therefore an object of the present disclosure to dry the evaporator more effectively.

The above object is achieved by an air-conditioning control system including: a weather acquisition unit configured to obtain weather information including a weather forecast; a prediction unit configured to predict, based on the weather information, an amount of change in a quantity of water droplets adhering to an evaporator of an air conditioner installed in a vehicle; and a switching control unit configured to control switching of an inside/outside air switching mechanism of the air conditioner based on the amount of change, the inside/outside air switching mechanism switching air delivered to an interior of the vehicle to one of inside air and outside air, the inside air being air in the interior of the vehicle, the outside air being air outside the vehicle.

In the air-conditioning control system, the prediction unit may be configured to predict the amount of change based on the weather information and a characteristics map that defines a relationship between a combination of temperature and humidity and a predicted amount of change in the quantity of water droplets.

The air-conditioning control system may further includes: a history acquisition unit configured to obtain history information including operation history and movement history of the vehicle; and a date and time estimation unit configured to analyze the history information to estimate a movement resumption date and time indicating a scheduled date and time on which the vehicle starts moving again, wherein the weather acquisition unit may be configured to obtain the weather information including weather forecasts from a latest date and time included in the history information to the movement resumption date and time.

The air-conditioning control system may further include a water droplet estimation unit configured to estimate a current quantity of water droplets adhering to the evaporator, wherein the switching control unit may be configured to control switching of the inside/outside air switching mechanism based on an estimated quantity of water droplets and the amount of change, the estimated quantity of water droplets representing the current quantity of water droplets estimated by the water droplet estimation unit.

In the air-conditioning control system, the switching control unit may be configured to change a position of the inside/outside air switching mechanism to a position that causes the inside air to be introduced, when it is determined, based on the estimated quantity of water droplets and the amount of change, that it is impossible to dry an expected quantity of water droplets adhering to the evaporator by a movement resumption date and time indicating a scheduled date and time on which the vehicle starts moving again.

In the air-conditioning control system, the switching control unit may be configured to change a position of the inside/outside air switching mechanism to a position that causes the outside air to be introduced when it is determined, based on the estimated quantity of water droplets and the amount of change, that it is possible to dry an expected quantity of water droplets adhering to the evaporator by a movement resumption date and time indicating a scheduled date and time on which the vehicle starts moving again.

The air-conditioning control system further includes an orientation detection unit configured to detect a direction in which the vehicle faces, wherein the water droplet estimation unit may be configured to correct the estimated quantity of water droplets when the direction in which the vehicle faces while parked and a wind direction included in the weather information overlap.

In the air-conditioning control system, an air-conditioning management system installed in a data center may include the weather acquisition unit and the estimation unit, and an in-vehicle air-conditioning system installed in the vehicle may include the switching control unit.

In the air-conditioning control system, an in-vehicle air-conditioning system installed in the vehicle may include the weather acquisition unit, the estimation unit, and the switching control unit.

The above object is achieved by an air-conditioning management system including: a weather acquisition unit configured to obtain weather information including a weather forecast; a prediction unit configured to predict, based on the weather information, an amount of change in a quantity of water droplets adhering to an evaporator of an air conditioner installed in a vehicle; and a communication unit configured to transmit the amount of change to an in-vehicle air-conditioning system of the vehicle, wherein the in-vehicle air-conditioning system is configured to control switching of an inside/outside air switching mechanism of the air conditioner based on the amount of change, the inside/outside air switching mechanism switching air delivered to an interior of the vehicle to one of inside air and outside air, the inside air being air in the interior of the vehicle, the outside air being air outside the vehicle.

The above object is achieved by an in-vehicle air-conditioning system including: a water droplet estimation unit configured to estimate a current quantity of water droplets adhering to an evaporator of an air conditioner of a vehicle; a reception unit configured to receive change information transmitted from an air-conditioning management system, the air-conditioning management system predicting an amount of change in a quantity of water droplets adhering to the evaporator based on weather information including a weather forecast, the change information including the amount of change; and a switching control unit configured to control switching of an inside/outside air switching mechanism of the air conditioner based on an estimated quantity of water droplets and the amount of change included in the change information, the estimated quantity of water droplets representing the current quantity estimated by the water droplet estimation unit, the inside/outside air switching mechanism switching air delivered to an interior of the vehicle to one of inside air and outside air, the inside air being air in the interior of the vehicle, the outside air being air outside the vehicle.

BRIEF DESCRIPTION OF THE DRAWINGS

FIG. 7 illustrates history information;

FIG. 9 is a diagram for describing an exemplary method of estimating a movement resumption date and time;

FIG. 10 illustrates weather information;

FIG. 12 illustrates a prediction table;

DETAILED DESCRIPTION

Hereinafter, with reference to the accompanying drawings, an embodiment of the present disclosure will be described.

Figure 1:
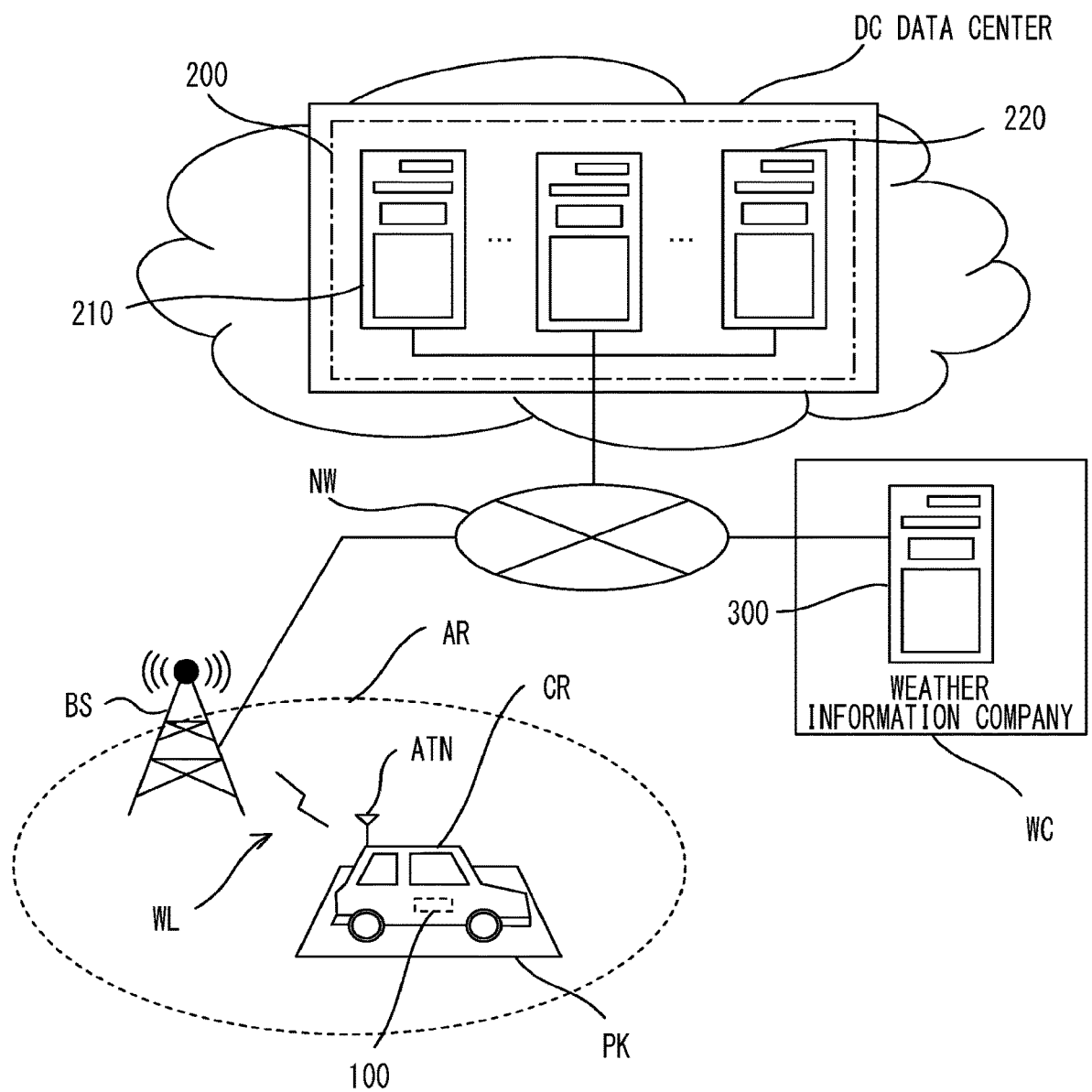
FIG. 1 is a diagram for describing an exemplary air-conditioning control system.

FIG. 1 is a diagram for describing an exemplary air-conditioning control system ST. As illustrated in FIG. 1, the air-conditioning control system ST includes an in-vehicle air-conditioning system 100 and an air-conditioning management system 200 as components. The in-vehicle air-conditioning system 100 is installed in a vehicle CR. The in-vehicle air-conditioning system 100 can transmit and receive a variety of information to and from a base station BS through an antenna ATN installed in the vehicle CR and wireless communication WL when the vehicle CR is located within the wireless communication area AR of the base station BS. The communication standard such as, but not limited to, Long Term Evolution (LTE) is used for the wireless communication WL. Although details will be described later, when the vehicle CR is parked in a parking area PK, the in-vehicle air-conditioning system 100 transmits, to the base station BS, history information including the operation history and the transfer history of the vehicle CR.

The base station BS is connected to a communication network NW. The communication network NW includes, for example, the Internet. The base station BS receives information transmitted from the in-vehicle air-conditioning system 100, and forwards the received information to the air-conditioning management system 200. The base station BS receives information transmitted from the air-conditioning management system 200, and forwards the received information to the in-vehicle air-conditioning system 100.

The air-conditioning management system 200 is installed in a data center DC providing a cloud service. The air-conditioning management system 200 has a plurality of management servers including a first management server 210 and a second management server 220. At least the first management server 210 and the second management server 220 are interconnected through a cable communication network such as a local area network (LAN). The air-conditioning management system 200 is connected to the communication network NW. In more detail, both the first management server 210 and the second management server 220 are connected to the communication network NW. Thus, for example, the first management server 210 can transmit a variety of information to the base station BS. For example, the second management server 220 can receive the information forwarded from the base station BS.

Here, a weather server 300 of a weather information company WC is connected to the communication network NW. The weather information company WC is a company that provides weather information. The weather information includes weather forecasts. The weather server 300 is managed by the weather information company WC. For example, when the first management server 210 requests the weather information from the weather server 300, the weather server 300 transmits the weather information to the first management server 210. Thereby, the first management server 210 obtains the weather information. Although details will be described later, the weather information includes forecasts of the temperature, the humidity, the amount of rainfall, the wind speed, and the wind direction for every unit of time on each date. When obtaining the weather information, the first management server 210 predicts an amount of change in the quantity of water droplets adhering to the evaporator of the air conditioner installed in the vehicle CR, and transmits information including the predicted amount of change to the in-vehicle air-conditioning system 100. Water droplets are generated by condensation. The term "water droplets" includes the concept of condensed water described above.

Next, with reference to FIG. 2, a hardware configuration of the in-vehicle air-conditioning system 100 will be described.

Figure 2:
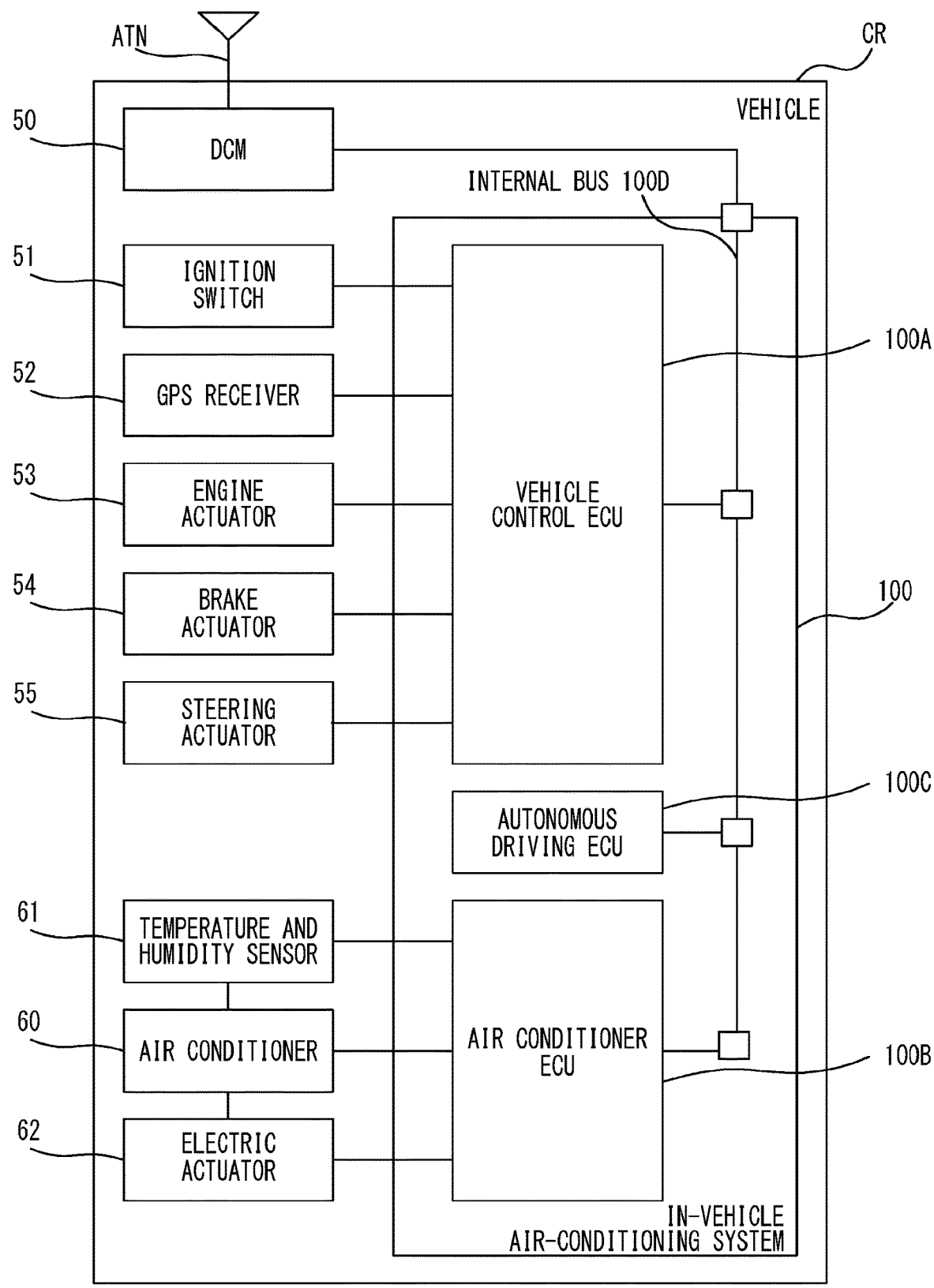
FIG. 2 illustrates a hardware configuration of an in-vehicle air-conditioning system.

FIG. 2 illustrates a hardware configuration of the in-vehicle air-conditioning system 100. As illustrated in FIG. 2, the in-vehicle air-conditioning system 100 includes a vehicle control electronic control unit (ECU) 100A and an air conditioner ECU 100B. The in-vehicle air-conditioning system 100 may include or does not necessarily include an autonomous driving ECU 100C. The vehicle control ECU 100A, the air conditioner ECU 100B, and the autonomous driving ECU 100C are connected to each other through an internal bus 100D. The vehicle control ECU 100A, the air conditioner ECU 100B, and the autonomous driving ECU 100C are integrated circuits (so called microcomputers) including a central processing unit (CPU), a random access memory (RAM), a read only memory (ROM), and an input-output interface (I/F). A program stored in the ROM is temporarily stored in the RAM by the CPU, and execution of the program by the CPU causes the CPU to implement various functions described later and execute various processes described later. The program is according to the operational sequence diagram described later.

A data communication module (DCM) 50 as a communication device installed in the vehicle CR is connected to the in-vehicle air-conditioning system 100. In particular, the DCM 50 includes the antenna ATN, and is connected to the internal bus 100D of the in-vehicle air-conditioning system 100. An ignition switch 51 and a global positioning system (GPS) receiver 52 installed in the vehicle CR are connected to the vehicle control ECU 100A. In addition, various actuators such as an engine actuator 53, a break actuator 54, and a steering actuator 55 installed in the vehicle CR are connected to the vehicle control ECU 100A. On the other hand, an air conditioner 60, a temperature and humidity sensor 61, and an electric actuator 62 installed in the vehicle CR are connected to the air conditioner ECU 100B. Examples of the electric actuator 62 include, but are not limited to, a stepping motor. The air conditioner ECU 100B controls the operation of the electric actuator 62 according to a program. Although details will be described later, the temperature and humidity sensor 61 measures the temperature and humidity of the evaporator included in the air conditioner 60, and outputs the measured temperature and humidity to the air conditioner ECU 100B. The electric actuator 62 drives an inside/outside air switching door as an inside/outside air switching mechanism included in the air conditioner 60. Instead of the inside/outside air switching door, an inside/outside air switching damper may be used as the inside/outside air switching mechanism.

The autonomous driving ECU 100C holds various driving modes and autonomous driving status information corresponding to each driving mode, and sets at least one driving mode to the vehicle control ECU 100A according to a program. This causes the vehicle control ECU 100A to control the operations of the break actuator 54 and the steering actuator 55.

The autonomous driving status information is classified into six driving automation levels "0" to "5" according to the degree of driving automation based on the standard defined by Society of Automotive Engineers (SAE). For example, a driving mode (a so-called cruise control function) that reduces a burden on a driver such as a burden of accelerator operation or brake operation on the driver by following a vehicle driving in front of the vehicle during the traffic jams or during drive on a freeway corresponds to partial automation or conditional automation, which correspond to the driving automation level "2" or the driving automation level "3", respectively. A driving mode (a so-called parking assistance function) that reduces a burden of steering operation and brake operation on the driver during parking of a vehicle corresponds to driver assistance or partial automation, which correspond to the driving automation level "1" or the driving automation level "2", respectively.

A driving mode that allows a vehicle to travel around by remote control by a person other than the driver or a device without a driver performing a driving operation in the vehicle in specific places such as freeways, depopulated areas, or the premises of facilities (for example, a university and an airport) corresponds to high automation, which corresponds to the driving automation level "4". On a freeway, for example, a mobile shop vehicle goes the rounds of rest areas. In depopulated areas, a vehicle goes the rounds of public facilities (for example, a city hall and community halls). In the premises of facilities, a vehicle goes the rounds of buildings and stops. A driving mode that allows a vehicle to cruise around by remote control by a person other than the driver or a device without a driver performing a driving operation in the vehicle not only in the above described specific places but also in community roads corresponds to full automation, which corresponds to the driving automation level "5". In the case of the driving automation level "4" or "5", the vehicle detects persons, bicycles, signs, and signals on the road to make decisions, and cruises.

Next, with reference to FIG. 3, the details of the above-described air conditioner 60 will be described.

Figure 3:
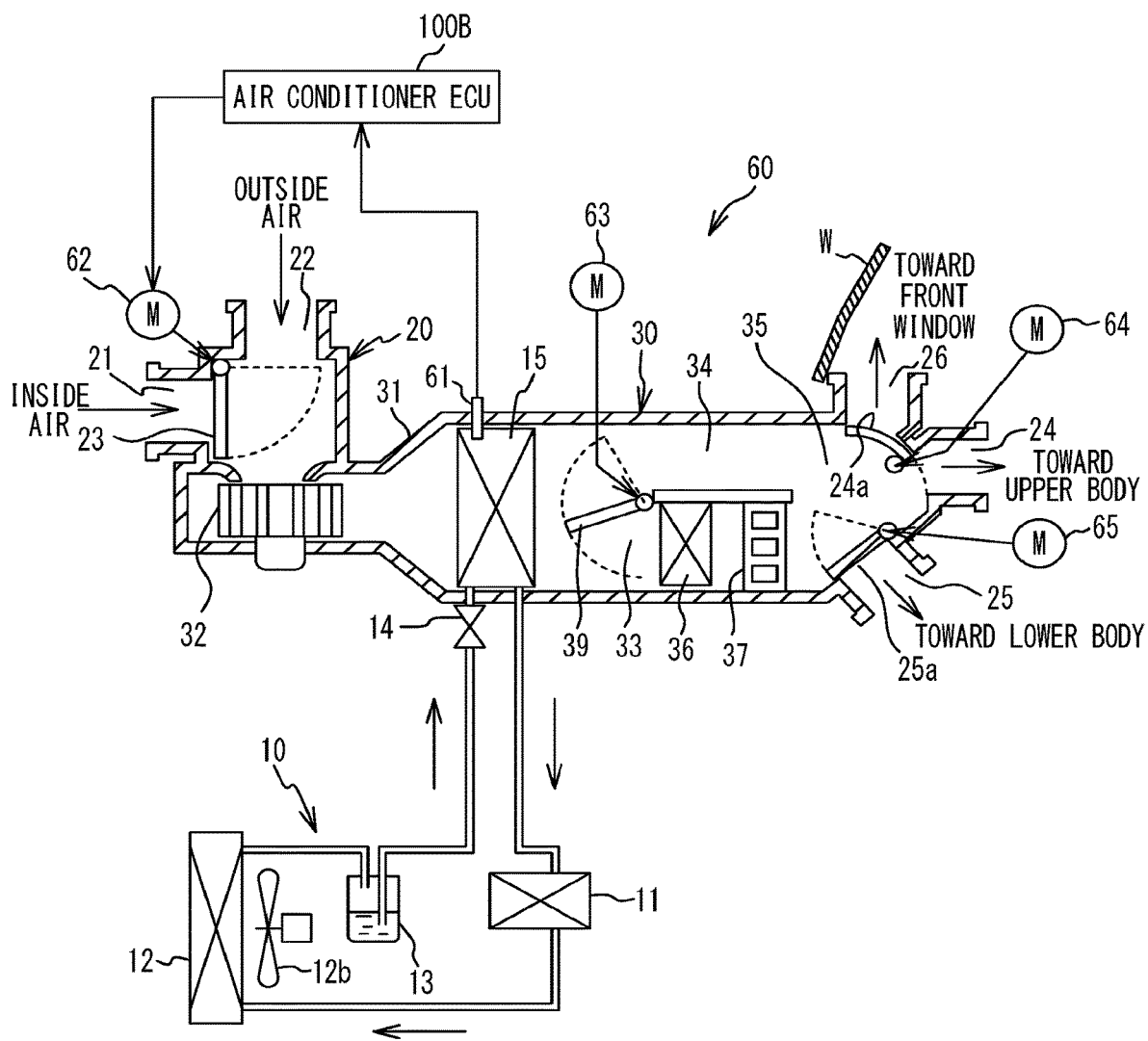
FIG. 3 is a diagram for describing details of an air conditioner.

FIG. 3 is a diagram for describing details of the air conditioner 60. The air conditioner 60 includes a cooling unit 10, an inside/outside air switching unit 20, and an indoor air-conditioning unit 30. The cooling unit 10 includes a compressor 11, a condenser 12, a receiver 13, an expansion valve 14, and an evaporator 15. The compressor 11, the condenser 12, the receiver 13, and the expansion valve 14 are arranged in the engine compartment of the vehicle CR. The compressor 11 sucks in a coolant, compresses the coolant, and discharges the compressed coolant. The coolant discharged from the compressor 11 passes through the inside of the condenser 12. The condenser 12 causes the coolant to exchange heat with the outside air to cool the coolant to condense the coolant. The outside air is air outside the vehicle CR. The outside air is blown from a blower fan 12b.

The receiver 13 separates the coolant condensed in the condenser 12 into a gas-phase coolant and a liquid-phase coolant, stores a surplus coolant, and delivers the liquid-phase coolant to the downstream side. The expansion valve 14 reduces the pressure of the liquid-phase coolant delivered from the receiver 13 to expand the liquid-phase coolant. The evaporator 15 evaporates the coolant expanded in the expansion valve 14 to cause the coolant to exert heat-absorption action. Thus, the evaporator 15 cools the air to be blown into the interior of the vehicle CR.

The inside/outside air switching unit 20 introduces one of the aforementioned outside air and the inside air that is the air in the interior of the vehicle CR. The inside/outside air switching unit 20 is arranged upstream in the air flow through a casing (e.g., an air duct) 31 that forms the outer shell of the indoor air-conditioning unit 30. An inside-air inlet 21 and an outside-air inlet 22 are formed in the inside/outside air switching unit 20. The inside-air inlet 21 is a vent introducing the inside air into the casing 31. The outside-air inlet 22 is a vent introducing the outside air into the casing 31.

An inside/outside air switching door 23 that changes the air volume ratio between the air volume of the inside air and the air volume of the outside air to be introduced into the casing 31 is arranged in the inside/outside air switching unit 20. The inside/outside air switching door 23 is driven by the electric actuator 62. The operation of the electric actuator 62 is controlled by the air conditioner ECU 100B.

The indoor air-conditioning unit 30 is arranged inside an instrument panel located in the forefront of the vehicle interior. The indoor air-conditioning unit 30 houses, in addition to the aforementioned evaporator 15, a blower 32, a heater core 36, and a positive temperature coefficient (PTC) heater 37 in the casing 31. The casing 31 forms an air passage for the air to be blown into the vehicle interior. The temperature and humidity sensor 61 is installed in the evaporator 15, measures the temperature and humidity of the air sucked in by the evaporator 15, and outputs the measured temperature and humidity to the air conditioner ECU 100B. In some embodiments, the temperature and humidity sensor 61 may measure the temperature and humidity of the air discharged from the evaporator 15, and output the measured temperature and humidity to the air conditioner ECU 100B. In some embodiments, the temperature and humidity sensor 61 may measure the temperature and humidity of the heat exchange fin of the evaporator 15, and output the measured temperature and humidity to the air conditioner ECU 100B.

The blower 32 is located downstream of the inside/outside air switching unit 20. The blower 32 delivers the air sucked in through the inside/outside air switching unit 20 to the vehicle interior. The blower 32 is an electric blower that drives fans with use of an electric motor. The fans of the blower 32 are arranged in the air passage, and deliver, to the air passage, the inside air from the inside-air inlet 21 and the outside air from the outside-air inlet 22.

The aforementioned evaporator 15 is located downstream of the blower 32. The evaporator 15 is arranged so as to cover the entire cross-section of the air passage. The evaporator 15 causes the coolant flowing through the inside of the evaporator 15 to exchange heat with the air delivered from the blower 32 to cool the air. A cool-air heating passage 33 and a cool-air bypass passage 34 through which the air after passing through the evaporator 15 flows are located in parallel downstream of the evaporator 15. In the cool-air heating passage 33, the heater core 36 and the PTC heater 37 for heating the air after passing through the evaporator 15 are arranged in this order in the flow direction of the delivered air. In the air passage, a mixing space 35 in which the air flowing from the cool-air heating passage 33 and the air flowing from the cool-air bypass passage 34 are mixed is formed downstream of the cool-air heating passage 33 and the cool-air bypass passage 34.

The heater core 36 heats the air after passing through the evaporator 15 with use of engine cooling water (hereinafter, simply referred to as cooling water) heated by the engine as a heating medium. On the other hand, the PTC heater 37 has a PTC element (a positive thermistor), generates heat by supply of the electric power to the PTC element, and thereby heats the air after passing through the heater core 36.

The cool-air bypass passage 34 is an air passage for the air after passing through the evaporator 15 to be guided into the mixing space 35 without passing through the heater core 36 and the PTC heater 37. Thus, the temperature of the air mixed in the mixing space 35 varies depending on the air volume ratio between the air passing through the cool-air heating passage 33 and the air passing through the cool-air bypass passage 34. Thus, in the present embodiment, an air mix door 39 is provided downstream of the evaporator 15 in the air passage and upstream of the inlets of the cool-air heating passage 33 and the cool-air bypass passage 34.

The air mix door 39 continuously changes the air volume ratio between cool air to be introduced into the cool-air heating passage 33 and cool air to be introduced into the cool-air bypass passage 34. In other words, the air mix door 39 adjusts the air temperature in the mixing space 35, i.e., the temperature of the air to be blown into the vehicle interior. An electric actuator 63 is connected to the air mix door 39. The electric actuator 63 drives the air mix door 39.

A plurality of vents is provided in the most downstream part of the casing 31. More specifically, a face vent 24, a front foot vent 25, and a defroster vent 26 are provided. The vents blow out the air of which the temperature has been adjusted into the vehicle interior, which is the air-conditioning target space, from the mixing space 35.

The face vent 24 is a vent blowing out the conditioned air toward the upper bodies of the driver and the passenger sitting in a passenger seat in the vehicle interior. The front foot vent 25 is a vent blowing out the conditioned air toward the lower bodies (for example, feet) of the driver and the passenger sitting in a passenger seat. The defroster vent 26 is a vent blowing out the conditioned air toward the inner surface of the front window W of the vehicle CR.

The face vent 24 and the defroster vent 26 are located adjacent to each other. A face defroster door 24a, which adjusts the opening areas of the face vent 24 and the defroster vent 26, is arranged upstream of the face vent 24 and the defroster vent 26. The face defroster door 24a is connected to an electric actuator 64. The electric actuator 64 drives the face defroster door 24a. In addition, a foot door 25a, which adjusts the opening area of the front foot vent 25, is located upstream of the front foot vent 25 in the air flow direction. The foot door 25a is connected to an electric actuator 65. The electric actuator 65 drives the foot door 25a.

Next, with reference to FIG. 4, the hardware configuration of the air-conditioning management system 200 will be described.

Figure 4:
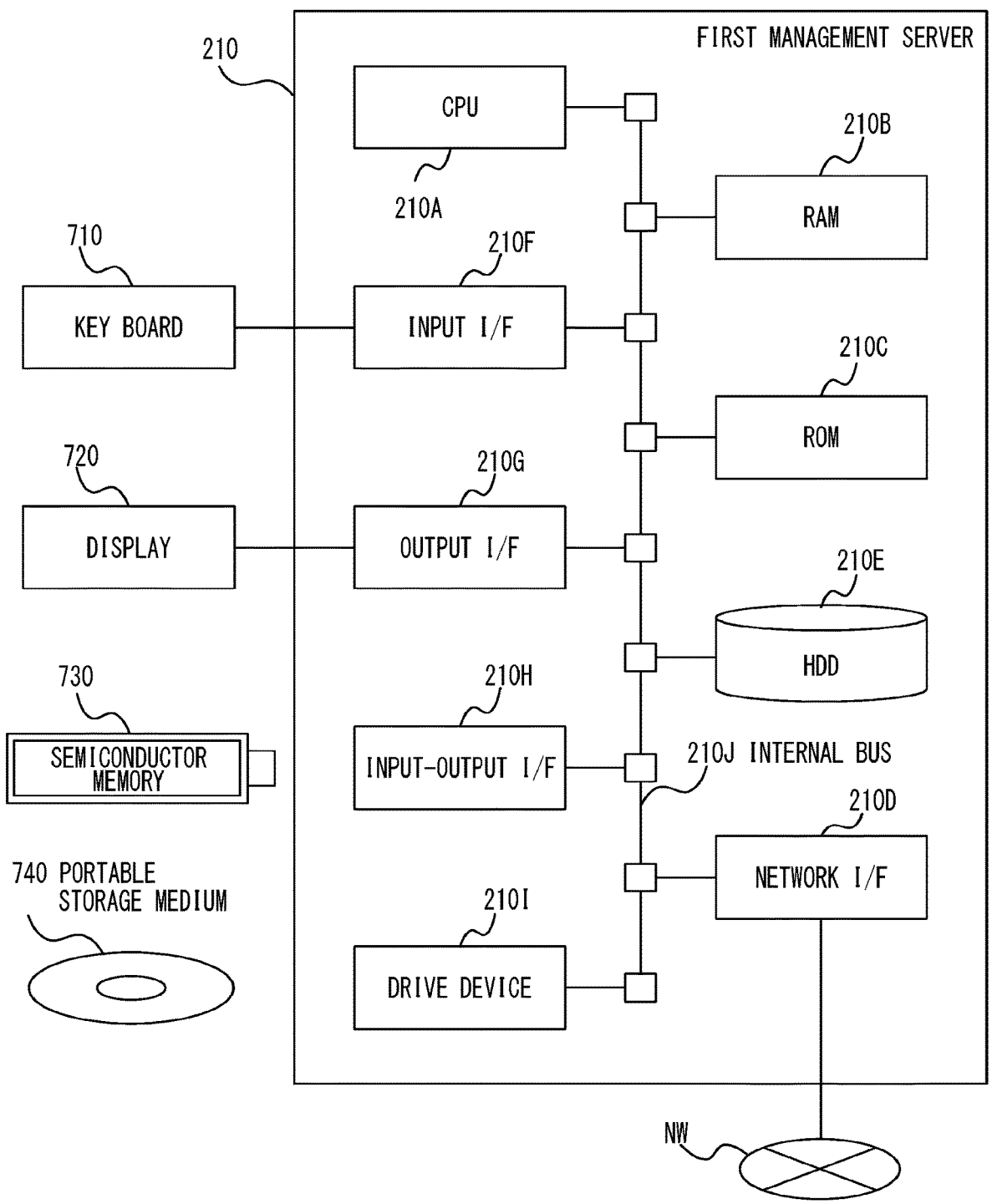
FIG. 4 illustrates a hardware configuration of a first management server of the air-conditioning management system.

FIG. 4 illustrates a hardware configuration of the first management server 210 of the air-conditioning management system 200. The second management server 220 of the air-conditioning management system 200 and the weather server 300 basically have the same or similar hardware configuration as the first management server 210, and the description thereof is thus omitted. As illustrated in FIG. 4, the first management server 210 includes at least a CPU 210A as a processor, a RAM 210B, a ROM 210C, and a network I/F 210D. Instead of the CPU 210A, an MPU may be used as a processor. The first management server 210 may include at least one of a hard disk drive (HDD) 210E, an input I/F 210F, an output I/F 210G, an input-output I/F 210H, and a drive device 210I as necessary. The CPU 210A through the drive device 210I are connected to each other through an internal bus 210J.

A keyboard 710 and a mouse (not illustrated) are connected, as input devices, to the input I/F 210F. A display 720 is connected, as a display device, to the output I/F 210G. A semiconductor memory 730 is connected to the input-output I/F 210H. Examples of the semiconductor memory 730 include, but are not limited to, a universal serial bus (USB) memory and a flash memory. The input-output I/F 210H reads programs and data stored in the semiconductor memory 730. The input I/F 210F and the input-output I/F 210H have, for example, a USB port. The output I/F 210G has, for example, a display port.

A portable storage medium 740 is inserted into the drive device 210I. Examples of the portable storage medium 740 include, but are not limited to, removable discs such as a compact disc (CD)-ROM and a digital versatile disc (DVD). The drive device 210I reads programs and data stored in the portable storage medium 740. The network I/F 210D has, for example, a LAN port. The network I/F 210D is connected to the aforementioned communication network NW.

A program stored in the ROM 210C and the HDD 210E is temporarily stored in the RAM 210B by the CPU 210A. A program stored in the portable storage medium 740 is temporarily stored in the RAM 210B by the CPU 210A. Execution of the stored program by the CPU 210A causes the CPU 210A to implement various functions described later and execute various processes described later. The program is according to the operational sequence diagram described later.

Next, with reference to FIG. 5, the functional configurations of the in-vehicle air-conditioning system 100, the air-conditioning management system 200, and the weather server 300 will be described. The details of the functions of the in-vehicle air-conditioning system 100, the air-conditioning management system 200, and the weather server 300 will be described all together when the operational sequence diagram described later is described.

Figure 5:
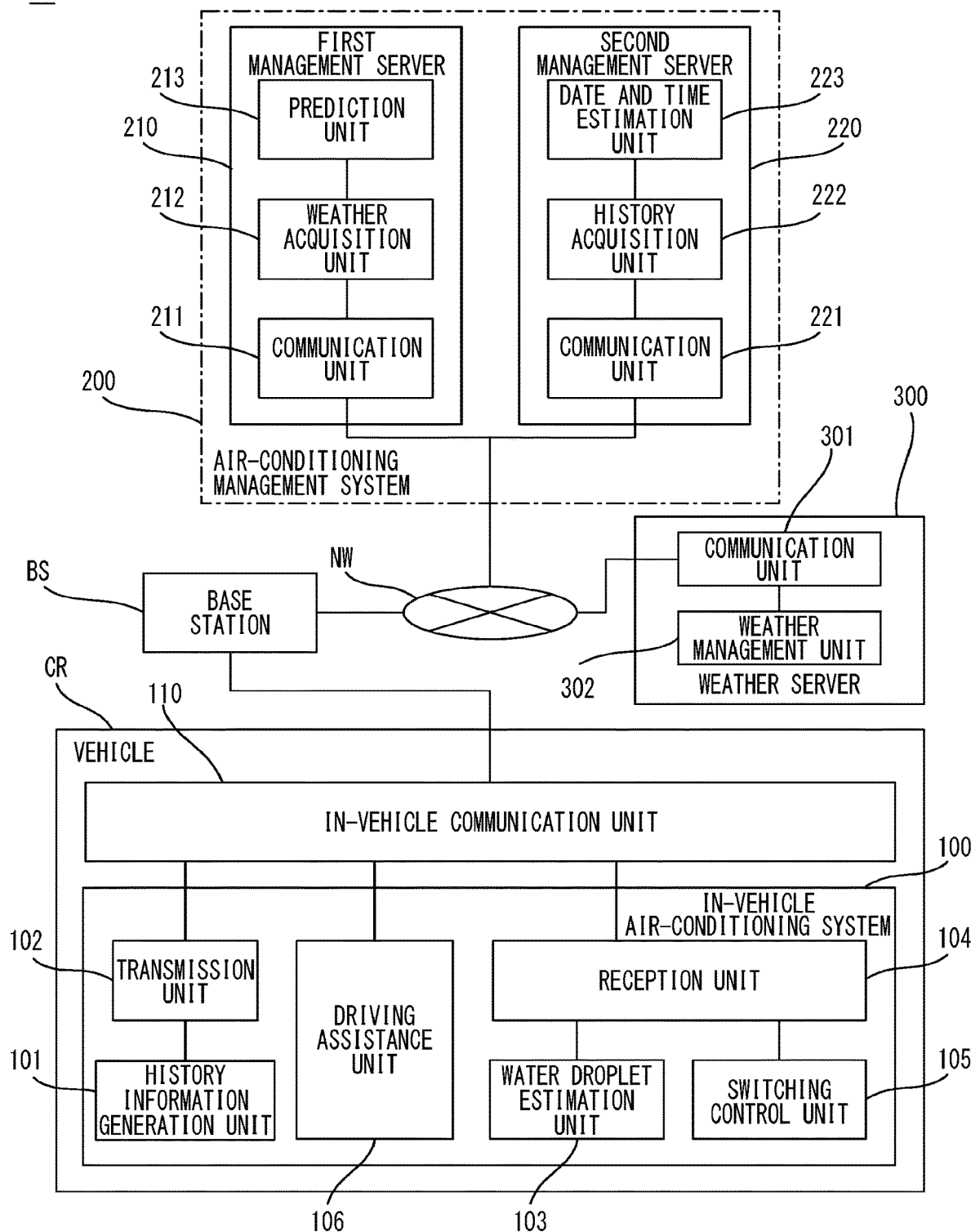
FIG. 5 is a block diagram of the in-vehicle air-conditioning system, the air-conditioning management system, and a weather server.

FIG. 5 is an exemplary block diagram of the in-vehicle air-conditioning system 100, the air-conditioning management system 200, and the weather server 300. The in-vehicle air-conditioning system 100 is installed in the vehicle CR together with an in-vehicle communication unit 110. The in-vehicle air-conditioning system 100 includes a history information generation unit 101 and a transmission unit 102. The history information generation unit 101 and the transmission unit 102 are implemented by the aforementioned vehicle control ECU 100A. The in-vehicle air-conditioning system 100 includes a water droplet estimation unit 103, a reception unit 104, and a switching control unit 105. The water droplet estimation unit 103, the reception unit 104, and the switching control unit 105 are implemented by the aforementioned air conditioner ECU 100B. The in-vehicle communication unit 110 is implemented by the aforementioned DCM 50.

The in-vehicle air-conditioning system 100 may include or does not necessarily include a driving assistance unit 106. When the in-vehicle air-conditioning system 100 includes the driving assistance unit 106, the driving assistance unit 106 can be implemented by the vehicle control ECU 100A and the autonomous driving ECU 100C.

The first management server 210 of the air-conditioning management system 200 includes a communication unit 211, a weather acquisition unit 212, and a prediction unit 213. The second management server 220 of the air-conditioning management system 200 includes a communication unit 221, a history acquisition unit 222, and a date and time estimation unit 223. The weather server 300 includes a communication unit 301 and a weather management unit 302. Three communication units 211, 221, and 301 are implemented by the respective network I/F 200D. The weather acquisition unit 212, the prediction unit 213, the history acquisition unit 222, the date and time estimation unit 223, and the weather management unit 302 are implemented by the respective CPU 200A.

Next, with reference to FIG. 6 through FIG. 12, operations of the in-vehicle air-conditioning system 100, the air-conditioning management system 200, and the weather server 300 will be described.

Figure 6:
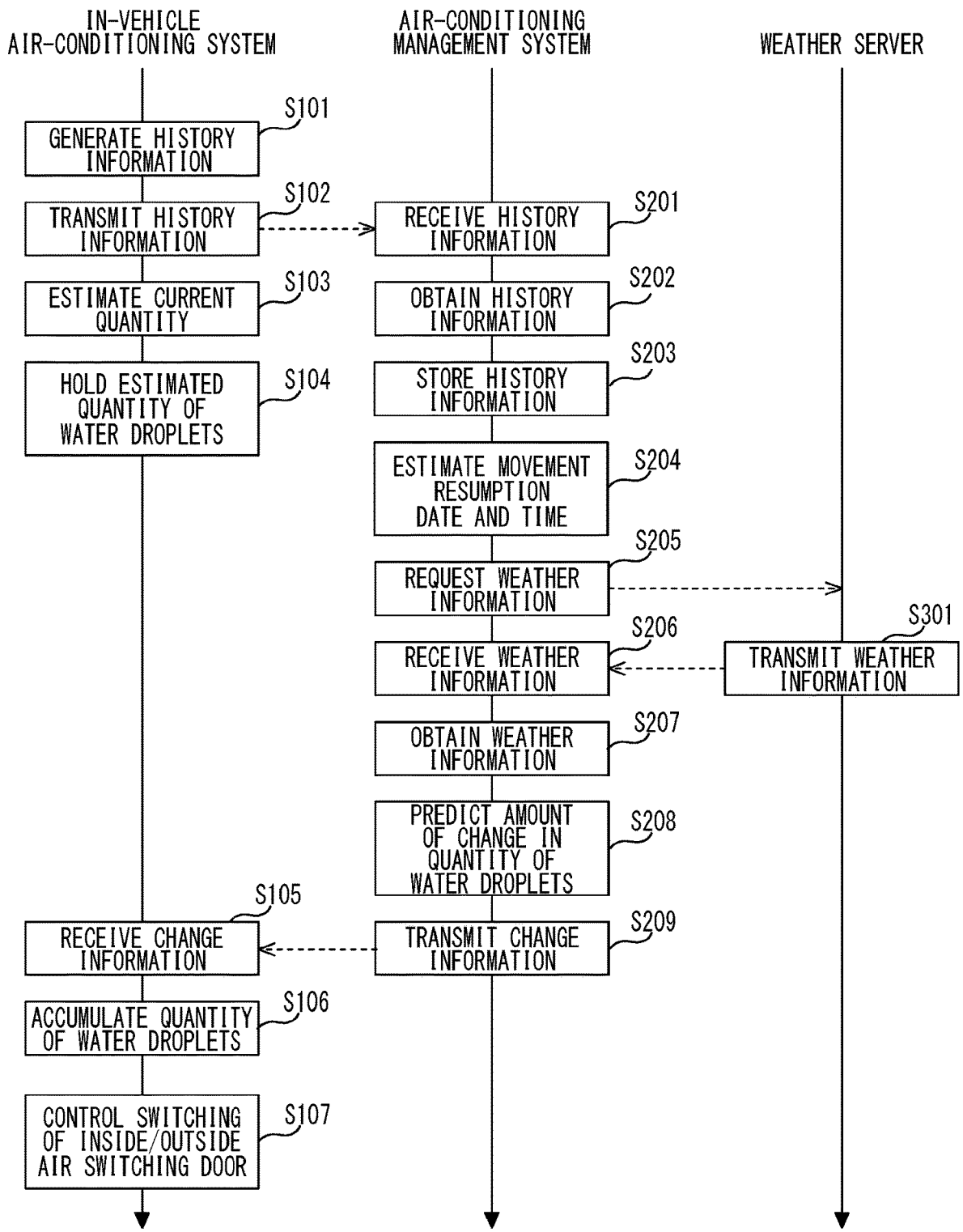
FIG. 6 is an operational sequence diagram illustrating operations of the in-vehicle air-conditioning system, the air-conditioning management system, and the weather server.
Figure 8A:
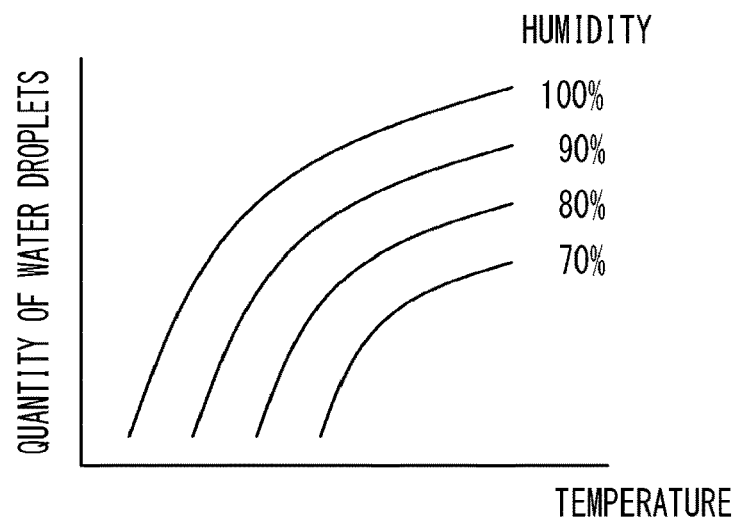
FIG. 8A illustrates a characteristics map of the quantity of water droplets.
Figure 8B:
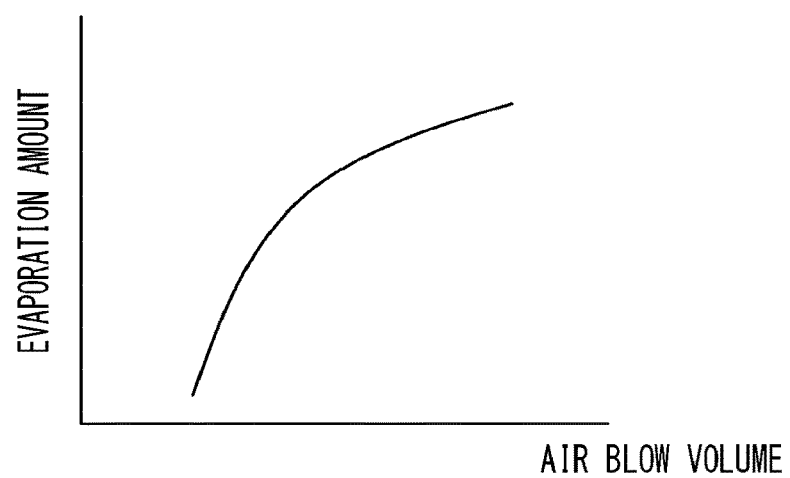
FIG. 8B illustrates a first characteristics map of an evaporation amount.
Figure 8C:
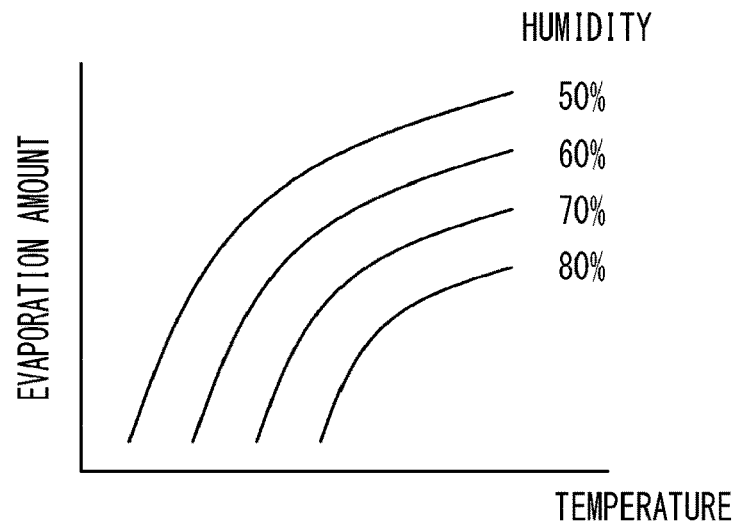
FIG. 8C illustrates a second characteristics map of an evaporation amount.
Figure 11:
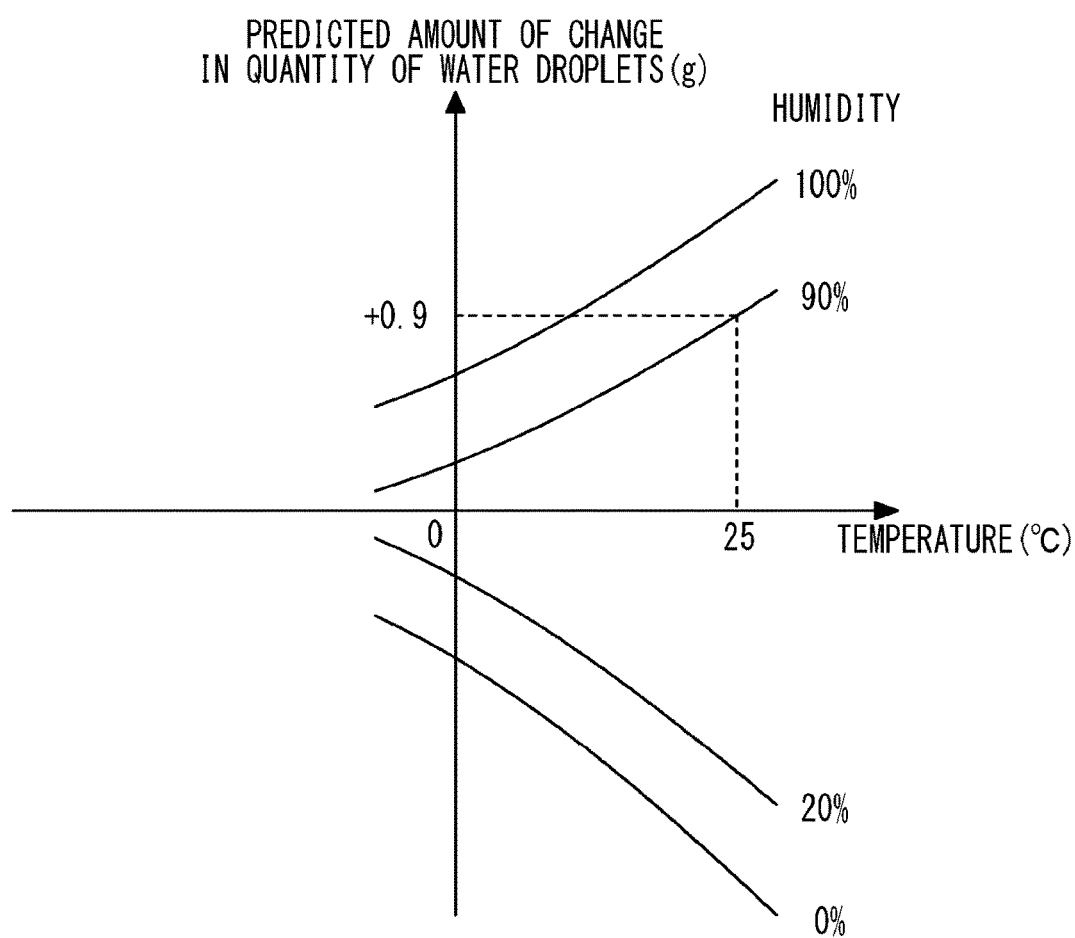
FIG. 11 illustrates a characteristics map of a predicted amount of change.

FIG. 6 is an operational sequence diagram illustrating operations of the in-vehicle air-conditioning system 100, the air-conditioning management system 200, and the weather server 300. FIG. 7 illustrates history information. FIG. 8A illustrates a characteristics map of the quantity of water droplets. FIG. 8B illustrates a first characteristics map of an evaporation amount. FIG. 8C illustrates a second characteristics map of an evaporation amount. FIG. 9 is a diagram for describing an exemplary method of estimating a movement resumption date and time. FIG. 10 illustrates weather information. FIG. 11 illustrates a characteristics map of a predicted amount of change. FIG. 12 illustrates a prediction table.

As illustrated in FIG. 6, the history information generation unit 101 generates history information (step S101). The history information includes the operation history of the vehicle CR and the movement history of the vehicle CR. In more detail, when detecting the switching operation of the ignition switch 51, the history information generation unit 101 identifies the detection date and time, and obtains positional information including the latitude and the longitude from the GPS receiver 52. The switching operation is turning on or off of the ignition switch 51. The history information generation unit 101 generates history information including the detection date and time, the switching operation, and the positional information.

Through step S101, as illustrated in FIG. 7, the history information is generated. For example, when the driver of the vehicle CR regularly travels between home and work due to commuting or the like, the switching operation of the ignition switch 51 is repeated in the same pattern. In more detail, consider a case where the driver leaves home and arrives at work. In this case, the ignition switch 51 is turned on at home (more specifically, the garage of driver's home or a parking lot near driver's home) indicated by the positional information (N1, E1). Then, the ignition switch 51 is turned off at a work site (more specifically, a parking lot of the work site) indicated by the positional information (N2, E2). When the driver leaves work and arrives at home, the ignition switch 51 is turned on at a location indicated by the positional information (N2, E2). Then, the ignition switch 51 is turned off at a location indicated by the positional information (N1, E1). The history information generation unit 101 generates the above-described history information, and transmits the generated history information to the transmission unit 102.

When the history information is output from the history information generation unit 101, as illustrated in FIG. 6, the transmission unit 102 transmits the history information to the air-conditioning management system 200 (step S102), and the water droplet estimation unit 103 estimates the current quantity of water droplets (step S103). In more detail, the transmission unit 102 transmits the history information output from the history information generation unit 101 to the air-conditioning management system 200 through the in-vehicle communication unit 110. When the transmission unit 102 transmits the history information, the water droplet estimation unit 103 estimates the current quantity of water droplets adhering to the evaporator 15. More specifically, the water droplet estimation unit 103 estimates the current quantity of water droplets based on the temperature and humidity of the evaporator 15 output from the temperature and humidity sensor 61 and the characteristics map of the quantity of water droplets. The water droplet estimation unit 103 may use the operating time of the compressor 11 when estimating the current quantity of water droplets. This improves the estimation accuracy.

The characteristics map of the quantity of water droplets defines a relationship between the combination of the temperature and humidity of the evaporator 15 and the quantity of water droplets as illustrated in FIG. 8A. When the temperature and humidity of the evaporator 15 are input to the water droplet estimation unit 103 from the temperature and humidity sensor 61, the water droplet estimation unit 103 puts the combination of the input temperature and humidity into the characteristics map of the quantity of water droplets to estimate the current quantity of water droplets adhering to the evaporator 15.

The water droplet estimation unit 103 may use a first characteristics map of an evaporation amount that defines a relationship between the evaporation amount of the evaporator 15 and the air blow amount of the blower 32 as illustrated in FIG. 8B to increase the estimation accuracy of the current quantity of water droplets. The water droplet estimation unit 103 may use a second characteristics map of an evaporation amount that defines a relationship between the combination of the temperature and humidity of the evaporator 15 and the evaporation amount as illustrated in FIG. 8C to increase the estimation accuracy of the current quantity of water droplets.

When the water droplet estimation unit 103 estimates the current quantity of water droplets, the water droplet estimation unit 103 holds the estimated quantity of water droplets (step S104). In more detail, the water droplet estimation unit 103 holds the estimated current quantity as the estimated quantity of water droplets, and waits until receiving change information described later.

On the other hand, the history information transmitted from the transmission unit 102 reaches the second management server 220 of the air-conditioning management system 200 through the base station BS and the communication network NW. As illustrated in FIG. 6, the communication unit 221 of the second management server 220 receives the history information output from the transmission unit 102 (step S201). When the communication unit 221 receives the history information, the history acquisition unit 222 obtains the history information from the communication unit 221 (step S202). Accordingly, the history acquisition unit 222 obtains the history information from the in-vehicle air-conditioning system 100.

When obtaining the history information, the history acquisition unit 222 stores the history information in a storage unit (not illustrated) (step S203). Accordingly, the storage unit stores the history information. The storage unit may be included in the second management server 220, or may be included in a management server other than the second management server 220. The history information stored in the storage unit is associated with an in-vehicle communication device ID as illustrated in FIG. 9. The in-vehicle communication device ID is identification information for identifying the DCM 50, and differs among the vehicles CR. The in-vehicle communication device ID is given to the history information by the in-vehicle communication unit 110 when the history information passes through the in-vehicle communication unit 110. Thus, the storage unit stores plural pieces of history information identified by the in-vehicle communication device IDs. Plural pieces of history information allow the history of the switching operation of the ignition switch 51 of the vehicle CR and the movement history of the vehicle CR to be managed with respect to each vehicle CR.

When the history acquisition unit 222 stores the history information, as illustrated in FIG. 6, the date and time estimation unit 223 estimates the movement resumption date and time (step S204). In more detail, the date and time estimation unit 223 obtains the history information from the storage unit and analyzes the history information to estimate the movement resumption date and time. For example, as illustrated in FIG. 9, when turning off of the ignition switch 51 and the positional information indicating home are associated with the latest detection date and time included in the history information, records before the latest detection date and time in the history information are analyzed to estimate the movement resumption date and time. In the present example, the date and time estimation unit 223 estimates the movement resumption date and time as 8:00 on Aug. 8, 2019. That is, according to the record of the latest detection date and time, the ignition switch 51 was turned off at home at 18:30. Thus, when the past similar records of the history information are analyzed, the movement resumption date and time can be estimated as 8:00 on Aug. 8, 2019. When the detection dates and times in the history information are dispersed, the date and time estimation unit 223 may use the average value of the detection dates and times to estimate the movement resumption date and time.

When the date and time estimation unit 223 estimates the movement resumption date and time, as illustrated in FIG. 6, the weather acquisition unit 212 requests the weather information from the weather server 300 (step S205). In more detail, when the date and time estimation unit 223 estimates the movement resumption date and time, the communication unit 221 transmits, to the communication unit 211, the movement resumption date and time estimated by the date and time estimation unit 223 together with the latest detection date and time of the history information. Thus, the communication unit 211 receives the movement resumption date and time and the latest detection date and time. The weather acquisition unit 212 requests the weather information including weather forecasts from the latest detection time and date to the movement resumption date and time (weather forecasts for specified dates and times) based on the movement resumption date and time and the latest detection date and time received by the communication unit 211.

When the weather server 300 is requested to provide the weather information, the weather management unit 302 identifies the weather information including weather forecasts for the specified dates and times from the weather information managed by the weather management unit 302, and outputs the identified weather information to the communication unit 301. The communication unit 301 transmits the weather information to the air-conditioning management system 200 (step S301). In more detail, the communication unit 301 transmits the weather information to the first management server 210 of the air-conditioning management system 200. The communication unit 211 receives the weather information (step S206).

When the communication unit 211 receives the weather information, the weather acquisition unit 212 obtains the weather information from the communication unit 211 (step S207). Accordingly, the weather acquisition unit 212 obtains, from the weather server 300, the weather information including weather forecasts for the specified dates and times.

Here, as illustrated in FIG. 10, the weather information includes forecasts of temperature, humidity, an amount of rainfall, and wind for a date and time. In FIG. 10, the temperature and humidity for every three hours are forecasted, but the unit time may be appropriately changed to, for example, one hour according to the weather information provided by the weather information company. The weather acquisition unit 212 requests the weather information including weather forecasts from 18:30 on Aug. 7, 2019 to 8:00 on Aug. 8, 2019. Thus, the weather acquisition unit 212 obtains the weather information including weather forecasts from 18:30 on Aug. 7, 2019 to 8:00 on Aug. 8, 2019. Thereby, the present embodiment eliminates unnecessary acquisition of records, not planned to be used in the subsequent processes, of the weather information.

When the weather acquisition unit 212 obtains the weather information, as illustrated in FIG. 6, the prediction unit 213 predicts the amount of change in the quantity of water droplets (step S208). In more detail, the prediction unit 213 predicts the amount of change in the quantity of water droplets adhering to the evaporator 15 based on the weather information obtained by the weather acquisition unit 212. In particular, the prediction unit 213 predicts the amount of change in the quantity of water droplets adhering to the evaporator 15 based on the weather information and the characteristics map of the predicted amount of change.

Here, the characteristics map of the predicted amount of change defines a relationship between the combination of the temperature and humidity of the weather information and the predicted amount of change in the quantity of water droplets as illustrated in FIG. 11. Based on the characteristics map of the predicted amount of change, it is predicted that the quantity of water droplets adhering to the evaporator 15 increases by 0.9 g (gram) based on the specific combination of the forecasted temperature "25° C." and humidity "90%" for 18:00 to 21:00 on Aug. 7, 2019 (see FIG. 10). After predicting the amount of change in the quantity of water droplets with respect to the specific combination, the prediction unit 213 changes the conditions of the temperature and humidity, and predicts the amount of change in the quantity of water droplets with respect to each of the combinations. For example, the prediction unit 213 changes the temperature by 5° C. increments or decrements, and changes the humidity by 10% increments or decrements, and predicts the amount of change in the quantity of water droplets with respect to each of the combinations of temperature and humidity.

This process allows the prediction table in which the amount of change in the quantity of water droplets is predicted with respect to each combination of temperature and humidity for 18:00 to 21:00 on Aug. 7, 2019 as illustrated in FIG. 12. The units by which temperature and humidity are changed can be appropriately changed. The prediction unit 213 may interpolate the amount of change in the quantity of water droplets for the combination of temperature and humidity not included in the prediction table by calculating the average value of the amounts of change in the quantity of water droplets corresponding to the temperatures sandwiching the temperature not included in the prediction table and/or the humidity sandwiching the humidity not included in the prediction table. Furthermore, in the same manner, the prediction unit 213 can obtain a prediction table that predicts the amount of change in the quantity of water droplets for each time period on each date.

Then, the prediction unit 213 outputs, to the communication unit 211, change information including the amount of change in the quantity of water droplets that can be identified by the weather information from the prediction table. For example, the prediction unit 213 can identify the combination of the temperature "26° C." and humidity "95%" and the combination of the temperature "27° C." and humidity "96%" in addition to the specific combination of the temperature "25° C." and humidity "90%" according to the weather information. Thus, the prediction unit 213 outputs, to the communication unit 211, the change information including the amounts of change in the quantity of water droplets corresponding to these combinations. The prediction unit 213 outputs, to the communication unit 211, the change information including a plurality of amounts of change such as the amount of change in the quantity of water droplets "+0.9" corresponding to the specific combination of the temperature "25° C." and humidity "90%". As illustrated in FIG. 6, the communication unit 211 transmits the change information output from the prediction unit 213 to the in-vehicle air-conditioning system 100 (step S209). The reception unit 104 receives the change information transmitted from the air-conditioning management system 200 (step S105).

When the reception unit 104 receives the change information, the switching control unit 105 accumulates the quantity of water droplets (step S106). In more detail, the switching control unit 105 sums up the estimated quantity of water droplets held by the water droplet estimation unit 103 and the amount of change in the quantity of water droplets included in the change information received by the reception unit 104. This enables to determine an expected quantity of water droplets of the evaporator 15 on the movement resumption date and time of the vehicle CR.

After accumulating the quantity of water droplets, the switching control unit 105 controls switching of the inside/outside air switching door 23 (step S107). For example, when the expected quantity of water droplets of the evaporator 15 on the movement resumption date and time obtained by accumulation of the quantity of water droplets is equal to or less than 0 gram, the switching control unit 105 determines that the evaporator 15 can be dried by the movement resumption date and time of the vehicle CR, and changes the position of the inside/outside air switching door 23 to the position that causes the outside air to be introduced. On the other hand, when the expected quantity of water droplets of the evaporator 15 on the movement resumption date and time obtained by accumulation of the quantity of water droplets is greater than 0 gram, the switching control unit 105 determines that the evaporator 15 cannot be dried by the movement resumption date and time of the vehicle CR, and changes the position of the inside/outside air switching door 23 to the position that causes the inside air to be introduced. Thereby, the possibility that the quantity of water droplets of the evaporator 15 increases due to the introduction of the outside air is reduced, and air containing unpleasant odor is prevented from blowing into the vehicle interior.

A case where the in-vehicle air-conditioning system 100 does not include the driving assistance unit 106 has been described. However, when the in-vehicle air-conditioning system 100 includes the driving assistance unit 106, the driving assistance unit 106 can control the break actuator 54 and the steering actuator 55 to run the vehicle CR in aforementioned various driving modes. For example, the driving assistance unit 106 can run the vehicle CR in the driving mode specified by the information generated according to the operation on the switch by the driver of the vehicle CR.

Moreover, the driving assistance unit 106 may run the vehicle CR in the driving mode specified by the information transmitted from the data center DC. More specifically, the driving assistance unit 106 may run the vehicle CR without a driver and a passenger by the remote-operations from the data center DC. Examples of these vehicles CR include, but are not limited to, delivery trucks or delivery vehicles of cargos and packages. In this case, even when air containing unpleasant odor is blown out from the air conditioner 60 to the interior of the vehicle CR, since no passenger is in the vehicle interior, the influence of unpleasant odor contained in the air blown out is considered small. Thus, when the vehicle CR has autonomous driving status information indicating the autonomous driving level "4" or the autonomous driving level "5", the in-vehicle air-conditioning system 100

(more specifically, the switching control unit 105) may reduce the operation frequency of the compressor 11 so that the evaporator 15 is not completely dried.

Next, with reference to FIG. 13 and FIG. 14, other embodiments will be described.

Figure 13:
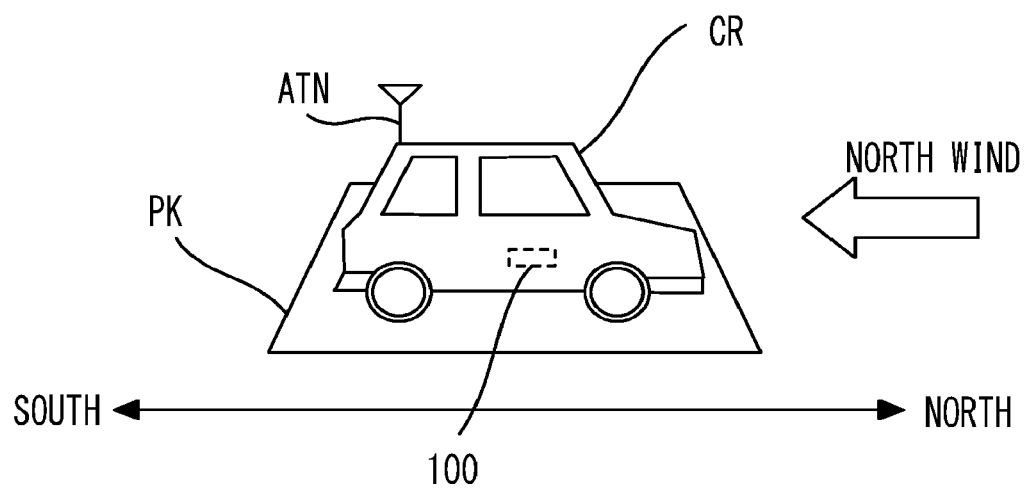
FIG. 13 is a diagram for describing a relationship between the direction in which the vehicle faces while parked and the direction of the wind.

FIG. 13 is a diagram for describing a relationship between the direction in which the vehicle CR faces while parked and the direction of the wind. For example, an orientation sensor may be mounted on the vehicle CR, and the water droplet estimation unit 103 may identify the direction in which the vehicle CR faces while parked based on the orientation detected by the orientation sensor. After identifying the direction in which the vehicle CR faces while parked, the water droplet estimation unit 103 obtains the weather information from the weather server 300. Then, when the direction in which the vehicle CR faces while parked overlaps with the direction of the wind included in the weather information, the water droplet estimation unit 103 corrects the estimated quantity of water droplets. As illustrated in FIG. 13, when the vehicle CR is parked facing the north in the parking area PK and the wind flows toward the vehicle CR from the north, use of the outside air to dry the evaporator 15 allows the evaporator 15 to be dried earlier than the planned dried date and time on which the expected quantity of water droplets determined by the switching control unit 105 becomes 0 gram. It is sufficient if the direction in which the vehicle CR faces while parked partially overlaps with the direction of the wind.

Figure 14:
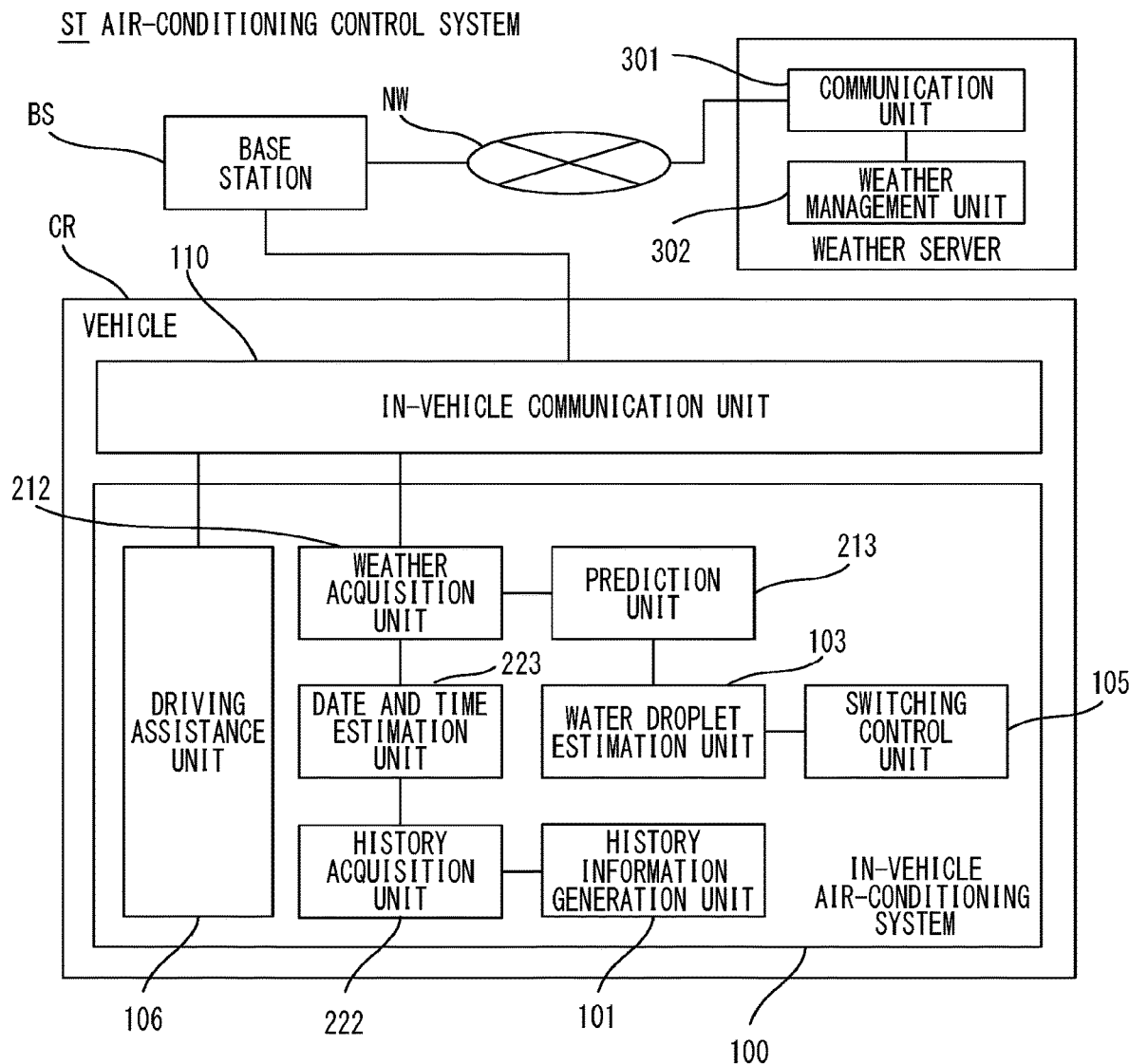
FIG. 14 is another block diagram of the air-conditioning control system.

FIG. 14 is another block diagram of the air-conditioning control system ST. As illustrated in FIG. 14, the in-vehicle air-conditioning system 100 may include the weather acquisition unit 212, the prediction unit 213, the history acquisition unit 222, and the date and time estimation unit 223. This configuration avoids communication such as transmission of the history information and reception of the change information between the in-vehicle air-conditioning system 100 and the air-conditioning management system 200. As a result, the load necessary for the communication on the in-vehicle communication unit 110 is reduced, and the in-vehicle communication unit 110 can be effectively used for other communication. In addition, since the in-vehicle air-conditioning system 100 includes the weather acquisition unit 212, the prediction unit 213, the history acquisition unit 222, and the date and time estimation unit 223, the cost for constructing the air-conditioning management system 200 is reduced.

On the other hand, since the processes executed by the prediction unit 213 and the date and time estimation unit 223 need many operations, and the power consumption may increase, and thereby, the stable driving of the vehicle CR may become difficult. In addition, when the performance of the in-vehicle air-conditioning system 100 is lower than that of the air-conditioning management system 200, high operational precision is less likely to be achieved. Thus, when the air-conditioning management system 200 includes the weather acquisition unit 212, the prediction unit 213, the history acquisition unit 222, and the date and time estimation unit 223, the stable driving of the vehicle CR and high operational precision are achieved.

As described above, the air-conditioning control system ST in accordance with the present embodiment includes the weather acquisition unit 212, the prediction unit 213, and the switching control unit 105. The weather acquisition unit 212 obtains the weather information including weather forecasts. The prediction unit 213 predicts the amount of change in the quantity of water droplets adhering to the evaporator 15 of the air conditioner 60 installed in the vehicle CR based on the weather information. The switching control unit 105 controls switching of the inside/outside air switching door 23, which switches air to be delivered to the interior of the vehicle CR to one of the inside air, which is the air inside the vehicle interior, and the outside air, which is the air outside the vehicle CR, of the conditioner 60. This configuration dries the evaporator 15 more effectively.

In the aforementioned embodiment, the start of parking of the vehicle CR and the end of parking of the vehicle CR are determined by turning on/off of the ignition switch 51. However, when the vehicle CR is a hybrid vehicle, instead of the ignition switch 51, switching on/off of a ready switch may be used.

In the aforementioned embodiment, the movement resumption date and time of the vehicle CR is estimated. However, when the air-conditioning management system 200 can be cooperate with an operation planning system that manages the operation plan of the vehicle CR by a computer, the movement resumption date and time managed by the operation planning system may be used without estimating the movement resumption date and time. For example, when the vehicle CR is a routine-run vehicle such as a regular route bus, the date and time of the first run bus is reliably determined from the date and time of the last bus. This improves the accuracy in predicting the amount of change in the quantity of water droplets. As described above, when the air-conditioning management system 200 is installed in the data center DC, a cloud service can be provided in cooperation with the operation planning system installed in a site different from the data center DC.

In the aforementioned embodiment, the water droplet estimation unit 103 estimates the current quantity of water droplets adhering to the evaporator 15 and holds the estimated quantity of water droplets, and sums up the estimated quantity of water droplets and the amount of change in the quantity of water droplets included in the change information. For example, the water droplet estimation unit 103 may transmit the estimated quantity of water droplets to the first management server 210, and the prediction unit 213 may sum up the estimated quantity of water droplets and the amount of change in the quantity of water droplets. In this case, the prediction unit 213 transmits, to the switching control unit 105, the control information for the inside/outside air switching door 23 according to the prediction result. More specifically, when the prediction unit 213 obtains the prediction result indicating that it is impossible to dry the evaporator 15 by the movement resumption date and time, the prediction unit 213 transmits the control information for changing the position of the inside/outside air switching door 23 to the position that causes the inside air to be introduced.

Although some embodiments of the present disclosure have been described in detail, the present disclosure is not limited to the specific embodiments but may be varied or changed within the scope of the present disclosure as claimed. For example, one of the first management server 210 and the second management server 220 may be installed in a site different from the data center DC. Functions included in the first management server 210 and the second management server 220 may be integrated into one management server, and the one management server may achieve the cloud service.

Furthermore, when the weather acquisition unit 212 obtains the weather information including the weather forecast that it is expected to be sunny, and become rainy after a certain period of time passes, the switching control unit 105 may control the switching of the inside/outside air switching door 23 as follows. That is, the switching control unit 105 may change the position of the inside/outside air switching door 23 to the position that causes the outside air to be introduced until a certain period of time has passed, and change the position of the inside/outside air switching door 23 to the position that causes the inside air to be introduced when a certain period of time has passed.

What is claimed is:

1. An air-conditioning control system comprising:
   a first server that includes a first memory and a first processor coupled to the first memory; and
   an air conditioner electronic control circuit that is mounted on a vehicle and includes a second memory and a second processor coupled to the second memory, wherein
   the first memory stores a first program that, when executed by the first processor, causes the first processor to:
      obtain weather information including a weather forecast; and
      predict, based on the weather information, an amount of change in a quantity of water droplets adhering to an evaporator of an air conditioner installed in the vehicle; and
      control switching of an inside/outside air switching mechanism of the air conditioner based on the amount of change, the inside/outside air switching mechanism switching air delivered to an interior of the vehicle to one of inside air and outside air, the inside air being air in the interior of the vehicle, the outside air being air outside the vehicle.

2. The air-conditioning control system according to claim 1, wherein
   the first memory stores the first program that, when executed by the first processor, further causes the first processor to:
   predict the amount of change based on the weather information and a characteristics map that defines a relationship between a combination of temperature and humidity and a predicted amount of change in the quantity of water droplets.

3. The air-conditioning control system according to claim 1, further comprising:
   a second server that includes a third memory and a third processor coupled to the third memory, wherein
   the third memory stores a third program that, when executed by the third processor, causes the third processor to:
   obtain history information including operation history and movement history of the vehicle; and
   analyze the history information to estimate a movement resumption date and time indicating a scheduled date and time on which the vehicle starts moving again, wherein
   the first memory stores the first program that, when executed by the first processor, further causes the first processor to:
   obtain the weather information including weather forecasts from a latest date and time included in the history information to the movement resumption date and time.

4. The air-conditioning control system according to claim 1, wherein
   the second memory stores the second program that, when executed by the second processor, further causes the second processor to:
   estimate a current quantity of water droplets adhering to the evaporator, wherein
   the second memory stores the second program that, when executed by the second processor, further causes the second processor to:
   control switching of the inside/outside air switching mechanism based on an estimated quantity of water droplets and the amount of change, the estimated quantity of water droplets representing the current quantity of water droplets estimated.

5. The air-conditioning control system according to claim 4, wherein
   the second memory stores the second program that, when executed by the second processor, further causes the second processor to:
   change a position of the inside/outside air switching mechanism to a position that causes the inside air to be introduced, when it is determined, based on the estimated quantity of water droplets and the amount of change, that it is impossible to dry an expected quantity of water droplets adhering to the evaporator by a movement resumption date and time indicating a scheduled date and time on which the vehicle starts moving again.

6. The air-conditioning control system according to claim 4, wherein
   the second memory stores the second program that, when executed by the second processor, further causes the second processor to:
   change a position of the inside/outside air switching mechanism to a position that causes the outside air to be introduced when it is determined, based on the estimated quantity of water droplets and the amount of change, that it is possible to dry an expected quantity of water droplets adhering to the evaporator by a movement resumption date and time indicating a scheduled date and time on which the vehicle starts moving again.

7. The air-conditioning control system according to claim 6, wherein
   the vehicle has an orientation sensor that detects a direction in which the vehicle faces, and wherein
   the second memory stores the second program that, when executed by the second processor, further causes the second processor to correct the estimated quantity of water droplets when the direction in which the vehicle faces while parked and a wind direction included in the weather information overlap.

8. The air-conditioning control system according to claim 1, wherein
   an air-conditioning management system installed in a data center includes the first server, and
   an in-vehicle air-conditioning system installed in the vehicle includes the air conditioner electronic control circuit.

9. The air-conditioning control system according to claim 1, wherein
   an in-vehicle air-conditioning system installed in the vehicle includes the first server and the air conditioner electronic control circuit.

10. An air-conditioning management system comprising:
    a first server that includes a first memory and a first processor coupled to the first memory, wherein
    the first memory stores a first program that, when executed by the first processor, causes the first processor to:

obtain weather information including a weather forecast;
predict, based on the weather information, an amount of change in a quantity of water droplets adhering to an evaporator of an air conditioner installed in a vehicle; and
transmit the amount of change to an in-vehicle air-conditioning system of the vehicle, the in-vehicle air-conditioning system including an air conditioner electronic control circuit that includes a second memory and a second processor coupled to the second memory, wherein
the second memory stores a second program that, when executed by the second processor, causes the second processor to
control switching of an inside/outside air switching mechanism of the air conditioner based on the amount of change, the inside/outside air switching mechanism switching air delivered to an interior of the vehicle to one of inside air and outside air, the inside air being air in the interior of the vehicle, the outside air being air outside the vehicle.

11. An in-vehicle air-conditioning system comprising:
an air conditioner electronic control circuit that is mounted on a vehicle and includes a second memory and a second processor coupled to the second memory, wherein
the second memory stores a second program that, when executed by the second processor, causes the second processor to:
estimate a current quantity of water droplets adhering to an evaporator of an air conditioner of the vehicle;
receive change information transmitted from an air-conditioning management system, the air-conditioning management system including a first server that includes a first memory and a first processor coupled to the first memory, the first memory storing a first program that, when executed by the first processor, causes the first processor to predict an amount of change in a quantity of water droplets adhering to the evaporator based on weather information including a weather forecast, the change information including the amount of change; and
control switching of an inside/outside air switching mechanism of the air conditioner based on an estimated quantity of water droplets and the amount of change included in the change information, the estimated quantity of water droplets representing the current quantity estimated, the inside/outside air switching mechanism switching air delivered to an interior of the vehicle to one of inside air and outside air, the inside air being air in the interior of the vehicle, the outside air being air outside the vehicle.

* * * * *